(12) United States Patent
Baek et al.

(10) Patent No.: US 9,063,372 B2
(45) Date of Patent: Jun. 23, 2015

(54) BACK-LIGHT UNIT AND LIQUID DISPLAY DEVICE INCLUDING THE SAME

(71) Applicant: Samsung Display Co., Ltd., Yongin, Gyeonggi-Do (KR)

(72) Inventors: Seung In Baek, Seoul (KR); Rae-Young Kim, Seoul (KR); Sun Hee Oh, Anyang-si (KR); Sang Woo Ha, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 112 days.

(21) Appl. No.: 13/861,317

(22) Filed: Apr. 11, 2013

(65) Prior Publication Data

US 2014/0022490 A1  Jan. 23, 2014

(30) Foreign Application Priority Data

Jul. 17, 2012 (KR) .......................... 10-2012-0077801

(51) Int. Cl.
G02F 1/1335 (2006.01)
F21V 7/04 (2006.01)
F21V 7/00 (2006.01)
F21V 13/04 (2006.01)

(52) U.S. Cl.
CPC ........ G02F 1/133603 (2013.01); F21V 7/0008 (2013.01); F21V 13/04 (2013.01); G02F 1/133605 (2013.01)

(58) Field of Classification Search
CPC . F21V 7/0008; F21V 13/04; G02F 1/133603; G02B 6/0073; G02B 6/005; G02B 6/0031

USPC .......................... 362/612, 623; 349/61, 67, 69
See application file for complete search history.

(56) References Cited

U.S. PATENT DOCUMENTS

| | | | |
|---|---|---|---|
| 8,058,782 B2 | 11/2011 | Lai | |
| 2006/0114690 A1 | 6/2006 | Iki et al. | |
| 2006/0221638 A1* | 10/2006 | Chew et al. | 362/613 |
| 2006/0261337 A1* | 11/2006 | Koma | 257/59 |
| 2010/0033954 A1* | 2/2010 | Boonekamp et al. | 362/97.1 |
| 2010/0214281 A1 | 8/2010 | Ueno et al. | |
| 2011/0260196 A1* | 10/2011 | Okagawa et al. | 257/98 |

FOREIGN PATENT DOCUMENTS

| | | |
|---|---|---|
| JP | 2006-021344 | 1/2006 |
| JP | 2006-245955 | 9/2006 |
| JP | 2008-053660 | 3/2008 |
| JP | 4444258 | 1/2010 |
| JP | 2010-123540 | 6/2010 |
| KR | 10-2006-0037637 | 5/2006 |
| KR | 10-2008-0080975 | 9/2008 |
| KR | 10-2008-0092146 | 10/2008 |
| KR | 10-2009-0120084 | 11/2009 |
| KR | 10-2011-0074148 | 6/2011 |

\* cited by examiner

Primary Examiner — Nathanael R Briggs
(74) Attorney, Agent, or Firm — Innovation Counsel LLP

(57) ABSTRACT

Provided is a back-light unit. The back-light unit includes: a reflective layer; a light transmitting plate including a plurality of light emitting diodes; and an optical member disposed on the light transmitting plate and separated from the light transmitting plate with an air layer therebetween, in which light generated from the light emitting diode is reflected to the reflective layer and then passes through the light transmitting plate to reach the optical member.

20 Claims, 7 Drawing Sheets

BACK-LIGHT UNIT AND LIQUID DISPLAY DEVICE INCLUDING THE SAME

CROSS-REFERENCE TO RELATED APPLICATION

This application claims priority to and the benefit of Korean Patent Application No. 10-2012-0077801 filed in the Korean Intellectual Property Office on Jul. 17, 2012, the entire contents of which are incorporated herein by reference.

BACKGROUND OF THE INVENTION (a) Field of the Invention

Embodiments of the present invention relate to a back-light unit and a liquid crystal display including the same.

(b) Description of the Related Art

In general, a liquid crystal display (LCD) is a typical flat panel display in which a transmittance of light is controlled corresponding to an image signal to display an image. However, since the liquid crystal display is not a self-light emitting element being capable of emitting light by itself, a separate light source which supplies the light at the rear side of a liquid crystal screen is required in order to visually display the image.

In this case, the liquid crystal display requires a back-light unit which has a complex power supply circuit for driving a light source and the light source itself including a lamp and additional elements which is needed to form uniform planar light, in order to irradiate the light from a rear side of a liquid crystal module to a liquid crystal panel of a front side thereof.

The back-light unit is classified into two types, a direct-lit type and an edge-lit type, according to an irradiating method of light. Recently, the direct-lit type and the edge-lit type flat panel backlights which apply planar light sources such as a light emitting diode (LED) have been actively researched.

In particular, in the direct-lit type LED backlight using a plurality of LEDs as light sources, a bright spot defect occurs due to a distance between the adjacent light emitting diodes. In order to solve the bright spot defect, the number of LEDs may be increased, but it accompanies an increase in manufacturing cost.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention have been made in an effort to provide a back-light unit having advantages of solving a white spot defect due to a distance between light emitting diodes and a liquid crystal display including the same.

An exemplary embodiment of the present invention provides a back-light unit, including: a reflective layer; a light transmitting plate including a plurality of light emitting diodes; and an optical member disposed on the light transmitting plate and spaced apart from the light transmitting plate with an air layer therebetween, in which light generated from the light emitting diode is reflected by the reflective layer and then passes through the light transmitting plate to reach the optical member, and in which the light emitting plate is formed of a plate without an opening.

The light transmitting plate may include a wiring electrically connecting the light emitting diodes to an external power supply.

The wiring may be formed of a light transmitting material.

The light transmitting material may be ITO or IZO.

The reflective layer may include a substrate and a support partition protruding up from an edge of the substrate, and the light transmitting plate may be fixed to the support partition.

The substrate and the support partition may be integrally formed.

The plurality of light emitting diodes may include a first light emitting diode which is disposed to be parallel to a horizontal surface of the reflective layer and a second light emitting diode which is disposed to be tilted to the horizontal surface of the reflective layer.

The first light emitting diode and the second light emitting diode may be randomly arranged.

Another exemplary embodiment of the present invention provides a back-light unit, including: a reflective layer; a plurality of light emitting diodes which is disposed at a portion which faces the reflective layer; a plurality of supporters supporting the plurality of light emitting diodes on the reflective layer; and an optical member disposed on the plurality of light emitting diodes, in which light generated from the light emitting diode is reflected to the reflective layer and then passes through a surface where the light emitting diode is disposed to reach the optical member.

The plurality of supporters may include at least one of glass, ITO and IZO.

The back-light unit may further include a support frame covering the reflective layer, in which the support frame may protrude up from the reflective layer, and the optical member may be positioned at a protruding end of the support frame.

The plurality of light emitting diodes may include a first light emitting diode which is disposed to be parallel to a horizontal surface and a second light emitting diode which is disposed to be tilted to the horizontal surface.

The first light emitting diode and the second light emitting diode may be randomly arranged.

The back-light unit may further include a lens portion formed on the light emitting diode.

Yet another exemplary embodiment of the present invention provides a liquid crystal display, including: a liquid crystal panel; and a back-light unit supplying light to the liquid crystal panel, in which the back-light unit includes a reflective layer, a light transmitting plate including a plurality of light emitting diodes which is disposed on an surface facing to the reflective layer and a wiring electrically connecting the light emitting diodes to an external power supply, and an optical member disposed on the light transmitting plate and separated from the light transmitting plate with an air layer therebetween, and a light emitting surface of the light emitting diode faces the reflective layer, and light generated from the light emitting diode is reflected to the reflective layer and then reaches the optical member.

According to the exemplary embodiments of the present invention, it is possible to solve a white spot defect of a back-light unit without increasing a thickness of a backlight module and the number of light emitting diodes.

DETAILED DESCRIPTION OF THE EMBODIMENTS

Figure 1:
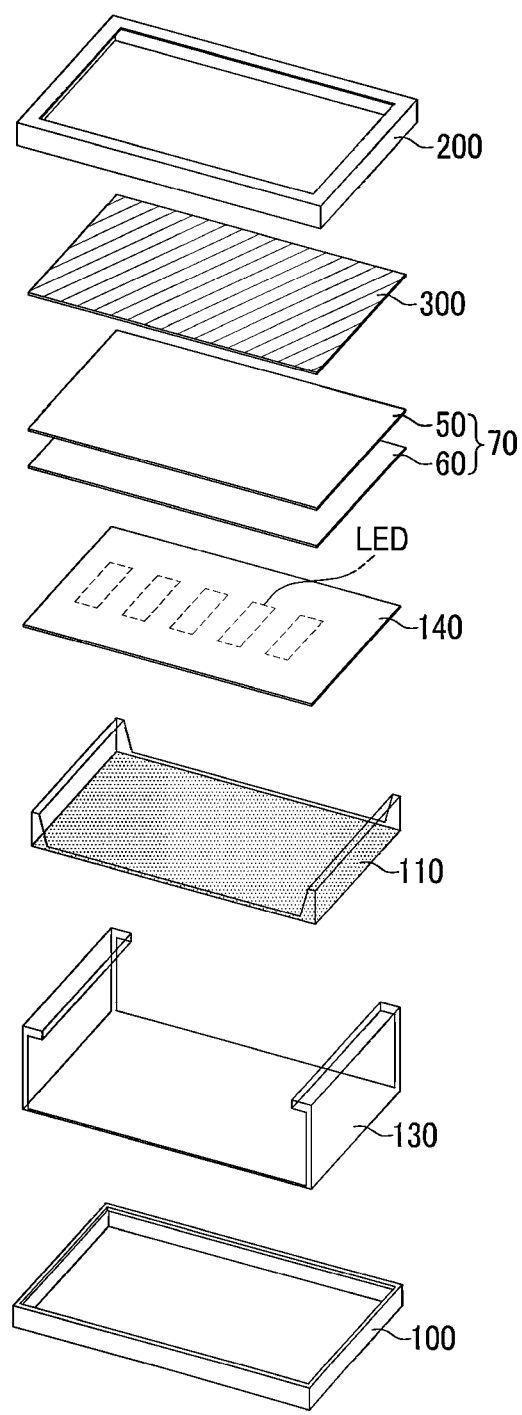
FIG. 1 is an exploded view illustrating a liquid crystal display according to an exemplary embodiment of the present invention.

Hereinafter, exemplary embodiments of the present invention will be described in detail with reference to the accompanying drawings. As those skilled in the art would realize, the described embodiments may be modified in various different ways, all without departing from the spirit or scope of the present invention. On the contrary, exemplary embodiments introduced herein are provided to make disclosed contents thorough and complete and sufficiently transfer the spirit of the present invention to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening them may also be present. Like reference numerals designate like elements throughout the specification.

Figure 2:
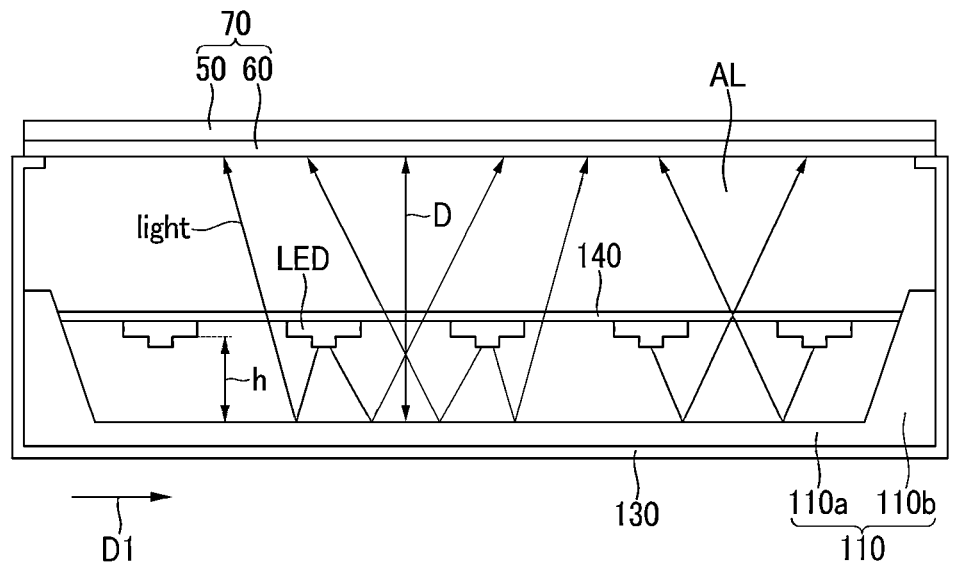
FIG. 2 is a cross-sectional view illustrating a back-light unit according to an exemplary embodiment of the present invention.

FIG. 1 is an exploded view illustrating a liquid crystal display according to an exemplary embodiment of the present invention. FIG. 2 is a cross-sectional view illustrating a backlight unit according to an exemplary embodiment of the present invention.

Referring to FIGS. 1 and 2, the liquid crystal display according to the exemplary embodiment includes a bottom cover 100, a support frame 130, a reflective layer 110, a light transmitting plate 140 with a light emitting diode (LED), an optical member 70, a liquid crystal panel 300, and a top cover 200.

In the exemplary embodiment, the support frame 130, the reflective layer 110, the light transmitting plate 140 with a light emitting diode (LED), and the optical member 70 may be constituent elements of the back-light unit, and the back-light unit is a unit of irradiating light to the liquid crystal display which may not self-emit light.

The top cover 200 may cover an edge of the optical member 70 and may be assembled and fastened to the bottom cover 100.

Hereinafter, a back-light unit according to the exemplary embodiment of the present invention will be described in detail with reference to FIG. 2.

In the back-light unit according to the exemplary embodiment, the light transmitting plate 140 is positioned on the reflective layer 110. A plurality of light emitting diodes (LEDs) is positioned on the light transmitting plate 140. In this case, the light emitting diode (LED) is positioned on the light transmitting plate 140 surface which faces the reflective layer 110 so that the light emitted from the light emitting diode (LED) faces the reflective layer 110.

The light transmitting plate 140 may be made of at least one of glass, indium-tin oxide (ITO), and indium-zinc oxide (IZO) so that the light emitted from the light emitting diode (LED) is reflected by the reflective layer 110 and pass through the light transmitting plate 140.

In order to have a space h of an additional light path, the light transmitting plate 140 may be disposed in the middle of the backlight module. In this case, an edge of the light transmitting plate 140 may be fixed to the reflective layer 110. In detail, the reflective layer 110 includes a substrate 110a and a support partition 110b which is protruded from an edge of the substrate 110a, and the edge of the light transmitting plate 140 may be fastened to the support partition 110b or may be attached to the support partition 110b by using a tape and the like.

The light transmitting plate 140 may be formed of one plate without an opening. A plurality of the light transmitting plate 140 formed of one plate may be formed in the LED back-light unit. Each of the plurality of light transmitting plates 140 may be fastened to the support partition 110b or may be attached to the support partition 110b by using a tape and the like.

The substrate 110a of the reflective layer 110 and the support partition 110b may be integrally formed by an injection molding method.

The light emitting diode (LED) may be connected with a wiring (not shown) in order to be electrically connected to an external power supply, and the wiring may be formed in the light transmitting plate 140. In this case, the wiring may be formed of a light transmitting material. For example, the wiring made of a light transmitting material such as indium-tin oxide (ITO) or indium-zinc oxide (IZO) may be formed in the light transmitting plate 140 made of glass or the like.

An optical member 70 including a prism sheet 50 and a diffuser sheet 60 is positioned on the light transmitting plate 140. The diffuser sheet 60 is disposed on the reflective layer 110 to uniformly distribute light which is reflected by the reflective layer 110. In addition, the prism sheet 50 is disposed on the top of the diffuser sheet 60, and guides the light from the diffuser sheet 60 to a display area of a liquid crystal panel (not shown) in which an image is displayed.

The support frame 130 is formed to cover the substrate 110a and the support partition 110b of the reflective layer 110. The support frame 130 includes a protruding portion protruding up from the support partition 110b, and the optical member 70 is positioned at an end of the protruding portion. An air layer AL is formed between the optical member 70 positioned at the end of the protruding portion of the support frame 130 and the light transmitting plate 140.

In the exemplary embodiment, a distance D between the reflective layer 110 and the optical member 70 is substantially equal to a thickness of the backlight module. The light emitting diode (LED) is fixed on the light transmitting plate 140. In addition, the light emitting diode (LED) emits light toward the reflective layer 110. As a result, a length of the light path may be a sum of a second distance h and a first distance D.

As described above, in the exemplary embodiment, it is possible to reduce a white spot defect due to interval distance between the light emitting diodes (LED) by increasing the length of light paths without increasing the number of the light emitting diodes (LED). The second distance h is larger than 0 and smaller than the first distance D. Furthermore, in a case where the number of the plurality of light emitting diodes (LED) is designed to become smaller by considering cost and the like, it is possible to reduce a white spot defect by increasing the second distance h.

Figure 3:
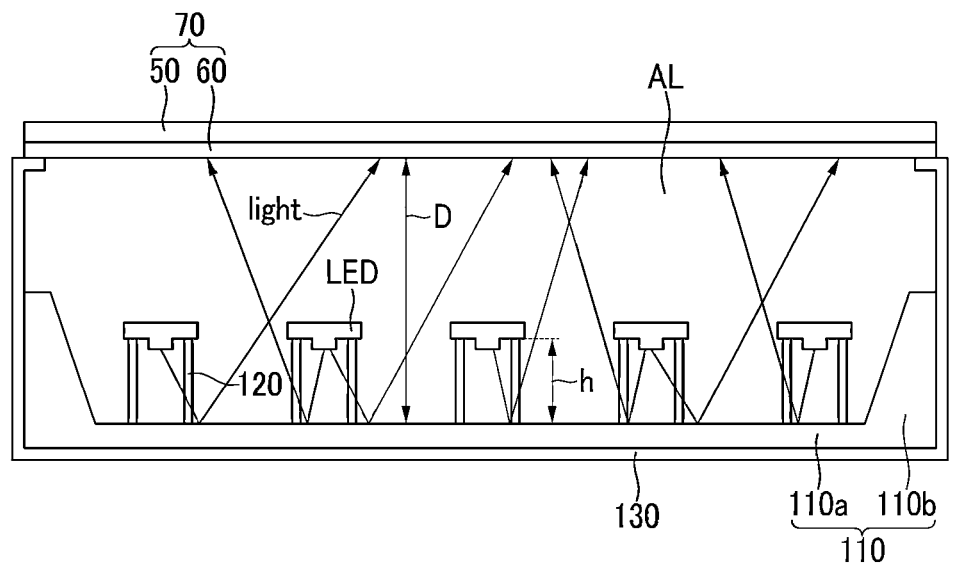
FIG. 3 is a cross-sectional view illustrating a back-light unit according to another exemplary embodiment of the present invention.

FIG. 3 is a cross-sectional view illustrating a back-light unit according to another exemplary embodiment of the present invention.

The exemplary embodiment of FIG. 3 is almost the same as the exemplary embodiment described in FIG. 2, and hereinafter, differences will be described.

Referring to FIG. 3, unlike the exemplary embodiment of FIG. 2, a light transmitting plate is not formed. Instead, a supporter 120 is formed between the plurality of light emitting diodes (LED) and the reflective layer 110. The supporter 120 is made of at least one of glass, indium-tin oxide (ITO), and indium-zinc oxide (IZO). In the exemplary embodiment, the supporter 120 is fastened to the substrate 110a of the reflective layer 110 or attached to the substrate 110a by using a tape and the like to fix the light emitting diode (LED). The supporter 120 serves to fix the light emitting diode (LED) to the reflective layer 110 while maintaining a light emitting direction of the light emitting diode (LED) toward the reflective layer 110. In FIG. 3, the reflective layer 110 may include the support partition 110b, but the support partition 110b may be omitted.

All the contents described in FIG. 2 may be applied to the exemplary embodiment of FIG. 3, except for the differences described above.

Hereinafter, a travel of light in the case of forming the back-light unit according to the exemplary embodiment of the present invention will be described.

Figure 4:
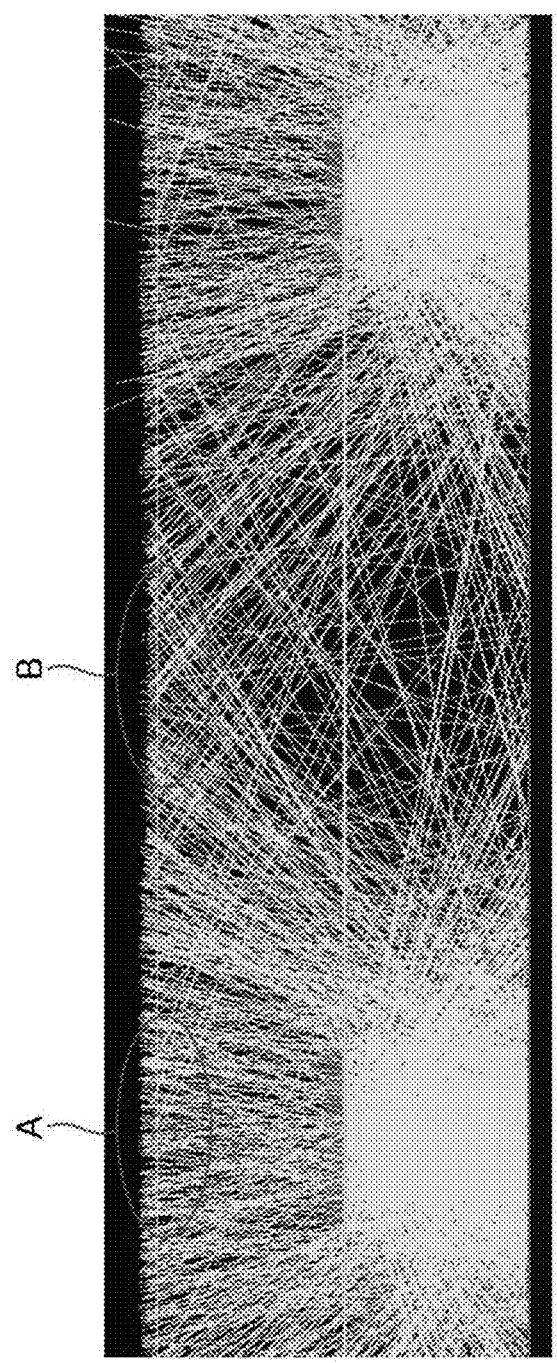
FIG. 4 is a simulation result graph in a direct type back-light unit according to Comparative Example.
Figure 5:
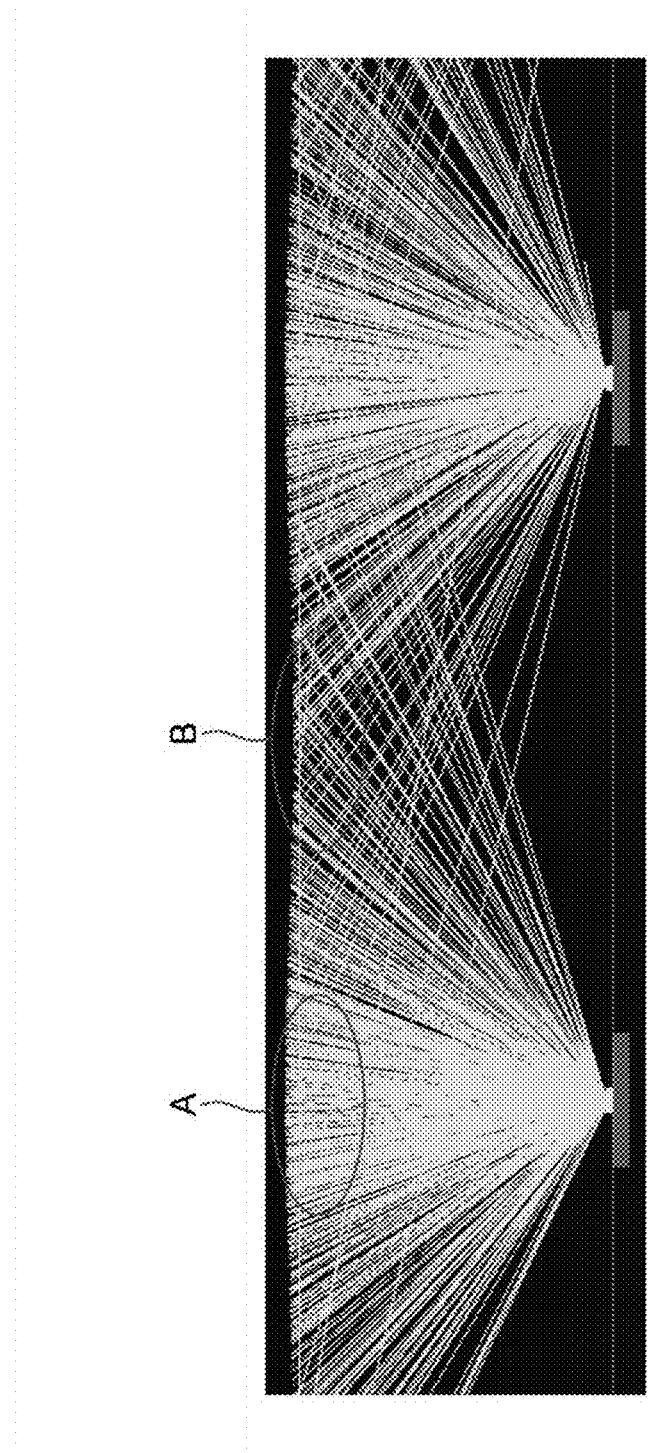
FIGS. 5 and 6 are simulation result graphs according to a position of a light emitting diode according to the exemplary embodiment of FIG. 2.
Figure 6:
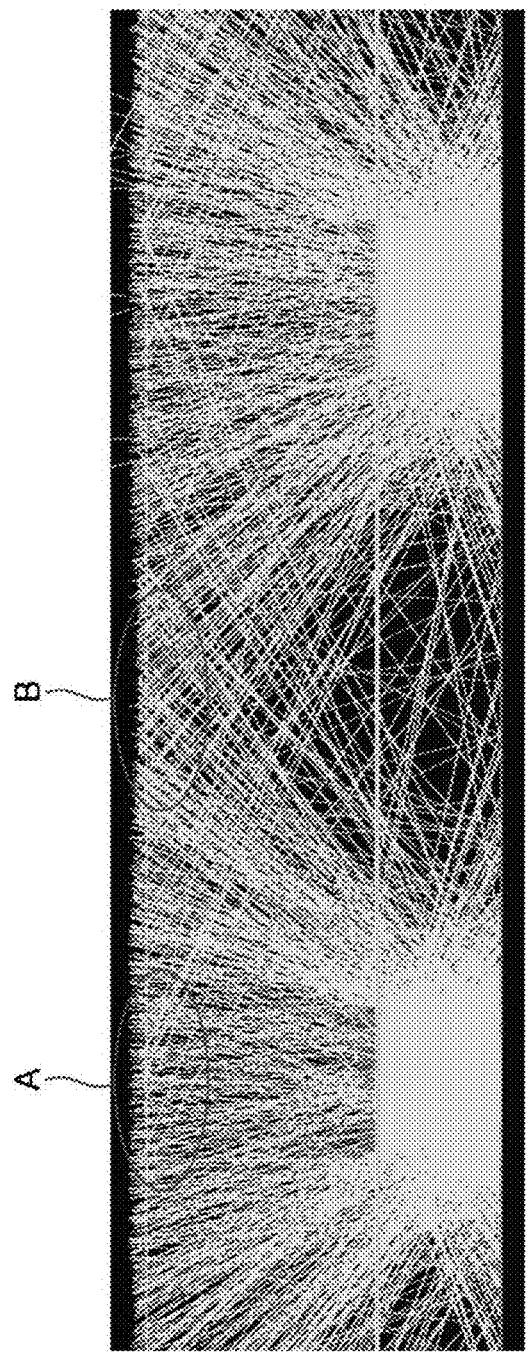

FIG. 4 is a simulation result graph in a direct-lit type back-light unit according to Comparative Example, and FIGS. 5 and 6 are simulation result graphs according to the exemplary embodiment of FIG. 2.

Referring to FIG. 4, a difference in a light amount between a first region A corresponding to a directly upper portion of the light emitting diode and a second region B corresponding to a region between the adjacent light emitting diodes is large. The first region A and the second region B may represent boundaries between the air layer AL and the optical member 70 described in FIG. 2, and the difference in the light amount between the first region A and the second region B may be represented as a screen defect such as a hot spot when viewed from the outside.

However, referring to FIGS. 5 and 6, in the exemplary embodiment of FIG. 2, when the first distance D is designed as 20 mm and the second distance h is designed as 7 mm and 10 mm, respectively, it may be verified that the difference in the light amount between the first region A and the second region B is significantly decreased as compared with Comparative Example.

Figure 7:
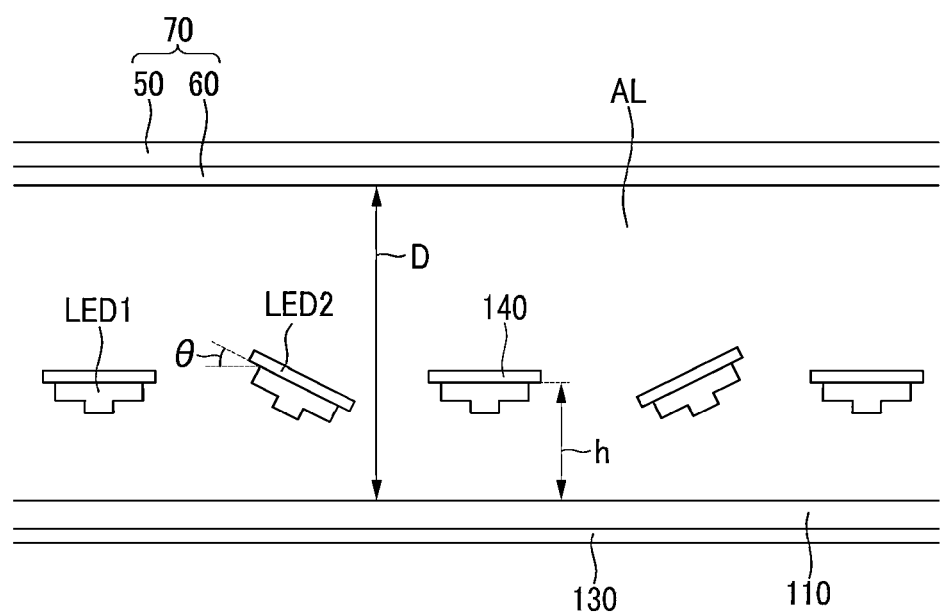
FIG. 7 is a cross-sectional view illustrating a back-light unit according to yet another exemplary embodiment of the present invention.

FIG. 7 is a cross-sectional view illustrating a back-light unit according to yet another exemplary embodiment of the present invention.

Referring to FIG. 7, a plurality of light emitting diodes (LED) may include a first light emitting diode LED1 which is disposed to be parallel to a horizontal surface of the reflective layer 110 and a second light emitting diode LED2 which is disposed to be tilted to the horizontal surface of the reflective layer 110 at a first angle θ. The first light emitting diode LED1 and the second light emitting diode LED2 may be randomly arranged.

FIG. 7 is a cross-sectional view when viewed in a first direction D1 with reference to the exemplary embodiment of FIG. 2. Although not illustrated in FIG. 7, a plurality of light transmitting plates 140 is formed, and an edge of the light transmitting plate 140 may be fastened to the support partition 110b of the reflective layer 110 or may be attached to the support partition 110b by using a tape and the like, as shown in FIG. 1.

In the exemplary embodiment, since the second light emitting diode LED2 which is tilted to the horizontal surface the reflective layer 110 at a predetermined angle, alight path may be increased.

Figure 8:
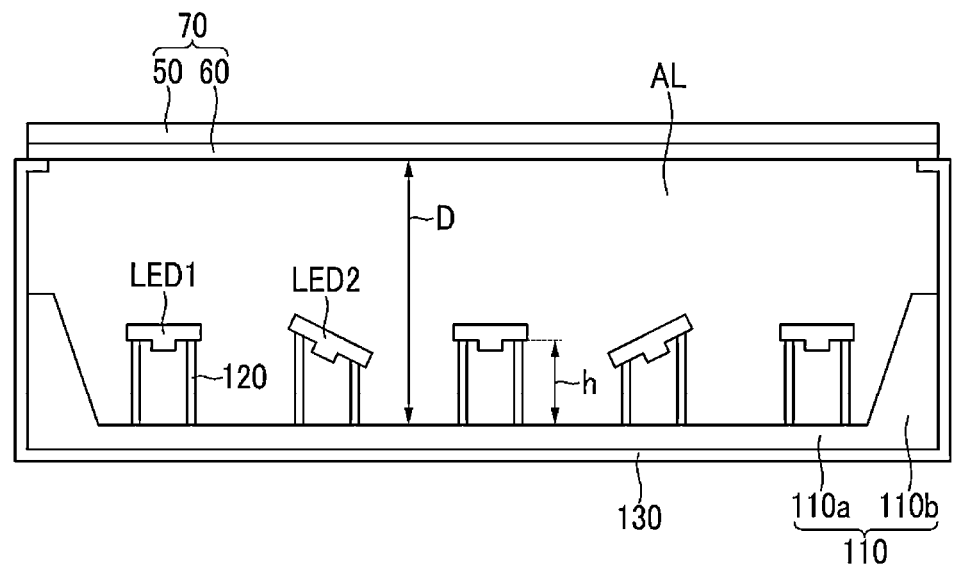
FIG. 8 is a cross-sectional view illustrating a back-light unit according to yet another exemplary embodiment of the present invention.

FIG. 8 is a cross-sectional view illustrating a back-light unit according to yet another exemplary embodiment of the present invention.

The exemplary embodiment of FIG. 8 is almost the same as the exemplary embodiment described in FIG. 7, and hereinafter, differences will be described.

Referring to FIG. 8, unlike the exemplary embodiment of FIG. 7, a light transmitting plate is not formed. Instead, the supporters 120 are formed between the light emitting diodes and the reflective layer 110. The supporter 120 is made of at least one of glass, indium-tin oxide (ITO), and indium-zinc oxide (IZO). In the exemplary embodiment, the supporter 120 may be fastened to the substrate 110a of the reflective layer 110 or attached to the substrate 110a by using a tape and the like to fix the first light emitting diode LED1 and the second light emitting diode LED2. The supporter 120 serves to fix the first and the second light emitting diodes, LED1 and LED2, to the reflective layer 110 while maintaining a light emitting direction of the first and the second light emitting diodes, LED1 and LED2, toward the reflective layer 110. In FIG. 8, the reflective layer 110 includes the support partition 110b, but the support partition 110b may be omitted. All the contents described in FIG. 7 may be applied to the exemplary embodiment of FIG. 8, except for the differences described above.

Figure 9:
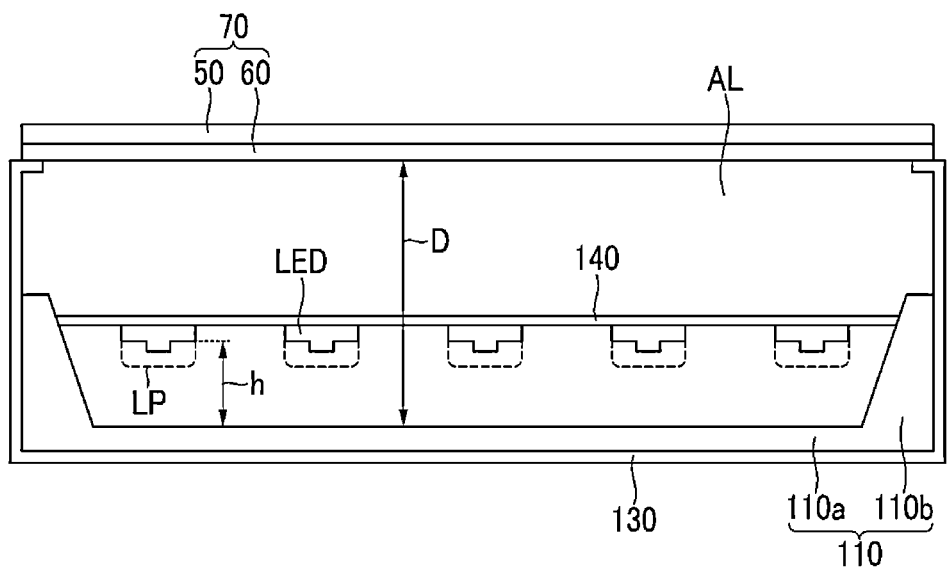
FIG. 9 is a cross-sectional view illustrating a back-light unit according to yet another exemplary embodiment of the present invention.

FIG. 9 is a cross-sectional view illustrating a back-light unit according to yet another exemplary embodiment of the present invention.

Referring to FIG. 9, the exemplary embodiment of FIG. 9 is almost the same as the exemplary embodiment of FIG. 2, but has a difference in that a lens portion LP is formed on a portion where the light emitting diode (LED) emits light.

The lens portion LP may serve to increase a directional angle of the light emitted from the light emitting diode (LED) to improve uniformity of light.

Although not shown, the configuration of the lens portion LP may also be applied to the exemplary embodiments of FIGS. 3, 7, and 8.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 50: Diffuser sheet | 60: Prism sheet |
| 70: Optical member | 110: Reflective layer |
| 120: Supporter | 130: Support frame |
| 140: Light transmitting plate | AL: Air layer |
| LED: Light emitting diode | |

What is claimed is:
1. A back-light unit, comprising:
a reflective layer; and
a light transmitting plate having a top surface facing an optical member, a bottom surface facing the reflective layer and a plurality of side surfaces connecting the top surface and the bottom surface, wherein the light transmitting plate including a plurality of light emitting diodes which are disposed on the bottom surface, wherein the optical member is disposed on the light transmitting plate and separated from the light transmitting plate with an air layer therebetween, wherein a light emitting surface of the light emitting diode faces the reflective layer, and light generated from the light emitting diode is reflected by the reflective layer and then reaches the optical member, wherein the light transmitting plate is formed of a plate without an opening, wherein the reflective layer comprises a substrate and a support partition protruding up from an edge of the substrate, and wherein the light transmitting plate is fixed to the support partition.

2. The back-light unit of claim 1, wherein:
the light transmitting plate further including a wiring electrically connecting the light emitting diodes to an external power supply.

3. The back-light unit of claim 2, wherein:
the wiring is formed of a light transmitting material.

4. The back-light unit of claim 3, wherein:
the light transmitting material is ITO or IZO.

5. The back-light unit of claim 2, wherein:
the substrate and the support partition are integrally formed.

6. The back-light unit of claim 1, wherein:
the plurality of light emitting diodes include a first light emitting diode which is disposed to be parallel to a horizontal surface of the reflective layer and a second light emitting diode which is disposed to be tilted to the horizontal surface of the reflective layer.

7. The back-light unit of claim 6, wherein:
the light transmitting plate further including a wiring electrically connecting the light emitting diodes to an external power supply.

8. The back-light unit of claim 7, wherein:
the wiring is ITO or IZO.

9. The back-light unit of claim 6, wherein:
the first light emitting diode and the second light emitting diode are randomly arranged.

10. A back-light unit, comprising:
a reflective layer;
a plurality of light emitting diodes which is disposed at a portion which faces the reflective layer;
a plurality of supporters, each of the plurality of supporters being configured to support the respective plurality of light emitting diodes on the reflective layer, the plurality of supporters being disposed on the reflective layer and maintaining a distance between the reflective layer and the plurality of light emitting diodes; and
an optical member disposed on the plurality of light emitting diodes,
wherein a light emitting surface of the light emitting diode faces the reflective layer, and light generated from the light emitting diode is reflected by the reflective layer and then passes through a surface where the light emitting diode is disposed to reach the optical member.

11. The back-light unit of claim 10, wherein:
the plurality of supporters comprises at least one of glass, ITO and IZO.

12. The back-light unit of claim 11, further comprising:
a support frame configured to cover the reflective layer,
wherein the support frame protrudes up from the reflective layer, and the optical member is positioned at a protruding end of the support frame.

13. The back-light unit of claim 10, wherein:
the plurality of light emitting diodes include a first light emitting diode which is disposed to be parallel to a horizontal surface of the reflective layer and a second light emitting diode which is disposed to be tilted to the horizontal surface of the reflective layer.

14. The back-light unit of claim 13, wherein:
the first light emitting diode and the second light emitting diode are randomly arranged.

15. The back-light unit of claim 10, further comprising:
a lens portion formed on the light emitting diode.

16. A liquid crystal display, comprising;
a liquid crystal panel; and
a back-light unit configured to supply light to the liquid crystal panel,
wherein the back-light unit comprises
a reflective layer, and
a light transmitting plate having a top surface facing an optical member, a bottom surface facing the reflective layer and a plurality of side surfaces connecting the top surface and the bottom surface,
wherein the light transmitting plate includes a plurality of light emitting diodes which are disposed on the bottom surface and a wiring electrically connecting the light emitting diodes to an external power supply,
wherein the optical member is disposed on the light transmitting plate and separated from the light transmitting plate with an air layer therebetween,
wherein a light emitting surface of the light emitting diode faces the reflective layer, and light generated from the light emitting diode is reflected by the reflective layer and then reaches the optical member,
wherein the light transmitting plate is formed of a plate without an opening,
wherein the reflective layer comprises a substrate and a support partition protruding up from an edge of the substrate, and
wherein the light transmitting plate is fixed to the support partition.

17. The liquid crystal display of claim 16, wherein:
the wiring is formed of a light transmitting material.

18. The liquid crystal display of claim 17, wherein:
the light transmitting material is ITO or IZO.

19. The back-light unit of claim 16, wherein:
the plurality of light emitting diodes include a first light emitting diode which is disposed to be parallel to a horizontal surface of the reflective layer and a second light emitting diode which is disposed to be tilted to the horizontal surface of the reflective layer.

20. The back-light unit of claim 13, wherein:
the second light emitting diode has a first supporter having a first length and a second supporter having a second length which is greater than the first length.

* * * * *